US012342200B2

(12) United States Patent
Xiao et al.

(10) Patent No.: US 12,342,200 B2
(45) Date of Patent: Jun. 24, 2025

(54) METHODS AND APPARATUS FOR MEASUREMENT AND REPORT INFORMATION FEEDBACK

(71) Applicant: Huawei Technologies Co., Ltd., Shenzhen (CN)

(72) Inventors: Weimin Xiao, Hoffman Estates, IL (US); Jialing Liu, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/731,845

(22) Filed: Apr. 28, 2022

(65) Prior Publication Data

US 2022/0256387 A1    Aug. 11, 2022

Related U.S. Application Data

(63) Continuation of application No. PCT/US2020/044950, filed on Aug. 5, 2020.
(Continued)

(51) Int. Cl.
*H04W 24/10* (2009.01)
*H04L 5/00* (2006.01)
*H04W 24/08* (2009.01)

(52) U.S. Cl.
CPC .......... *H04W 24/10* (2013.01); *H04L 5/0053* (2013.01); *H04L 5/0062* (2013.01); *H04W 24/08* (2013.01)

(58) Field of Classification Search
CPC .... H04W 24/10; H04W 24/08; H04L 5/0053; H04L 5/0062; H04L 1/20; H04L 5/0035;
(Continued)

(56) References Cited

U.S. PATENT DOCUMENTS 10,425,211 B2 *   9/2019   Kim ................... H04B 7/0626
11,424,803 B2 *   8/2022   Gao ................... H04B 7/0634
(Continued)

FOREIGN PATENT DOCUMENTS

EP          3383116 A1     12/2016

OTHER PUBLICATIONS

ZTE, "CQI computation for CoMP," 3GPP TSG RAN WG1 Meeting #67, Agenda Item 7.5.1.2, R1-113766, Nov. 14-18, 2011, 5 pages, San Francisco, USA.
(Continued)

*Primary Examiner* — Mounir Moutaouakil
(74) *Attorney, Agent, or Firm* — Slater Matsil, LLP

(57) ABSTRACT

A method implemented by a first device includes receiving a channel state information (CSI) reporting configuration associated with a set of measurement resources and a time-interval configuration, the set of measurement resources comprising at least interference measurement resources, and the time-interval configuration specifying a measurement duration and a reporting time configuration; deriving CSI reporting quantities in accordance with measurements of the set of measurement resources during at least a portion of the measurement duration, the CSI reporting quantities comprising statistical quantities associated with at least interference measurements of the set of measurement resources during the measurement duration; and reporting the CSI reporting quantities in accordance with the reporting time configuration.

28 Claims, 7 Drawing Sheets

Related U.S. Application Data

(60) Provisional application No. 62/932,234, filed on Nov. 7, 2019.

(58) Field of Classification Search
CPC ... H04L 5/0037; H04L 5/0055; H04L 5/0057; H04L 5/0091; H04L 2001/0092; H04L 1/0026
See application file for complete search history.

(56) References Cited

U.S. PATENT DOCUMENTS

| | | | |
|---|---|---|---|
| 2013/0279361 A1* | 10/2013 | Seo | H04W 24/02 370/252 |
| 2015/0171948 A1* | 6/2015 | Xiao | H04B 17/309 370/252 |
| 2016/0157248 A1* | 6/2016 | Lin | H04W 72/20 370/329 |
| 2016/0212752 A1* | 7/2016 | Xu | H04W 72/542 |
| 2017/0034840 A1* | 2/2017 | Mandil | H04W 72/12 |
| 2017/0041820 A1* | 2/2017 | Wei | H04W 72/04 |
| 2017/0063479 A1* | 3/2017 | Kim | H04L 5/00 |
| 2017/0181057 A1* | 6/2017 | Kishiyama | H04W 48/20 |
| 2018/0063736 A1* | 3/2018 | Sadeghi | H04W 24/10 |
| 2018/0242164 A1* | 8/2018 | Lee | H04L 1/0026 |
| 2018/0309491 A1* | 10/2018 | Yao | H04W 72/54 |
| 2019/0081679 A1* | 3/2019 | Davydov | H04W 72/23 |
| 2019/0103954 A1* | 4/2019 | Lee | H04L 5/0098 |
| 2019/0229781 A1* | 7/2019 | Jin | H04B 7/0628 |
| 2019/0268939 A1* | 8/2019 | Yang | H04W 72/20 |
| 2021/0112503 A1* | 4/2021 | Zhang | H04W 24/08 |
| 2021/0218455 A1* | 7/2021 | Park | H04L 5/0048 |
| 2021/0399866 A1* | 12/2021 | Li | H04W 72/20 |

OTHER PUBLICATIONS

Huawei, et al., "Differential CQI design for 4-branch MIMO," 3GPP TSG-RAN WG1 Meeting #70, R1-123818, Qingdao, China, Aug. 13-17, 2012, 7 pages.

Nokia, et al., "On CSI feedback enhancements for URLLC," 3GPP TSG-RAN WG1 Meeting #94bis, Agenda Item 7.2.6.5, R1-1810668, Chengdu, China, Oct. 8-12, 2018, 7 pages.

* cited by examiner

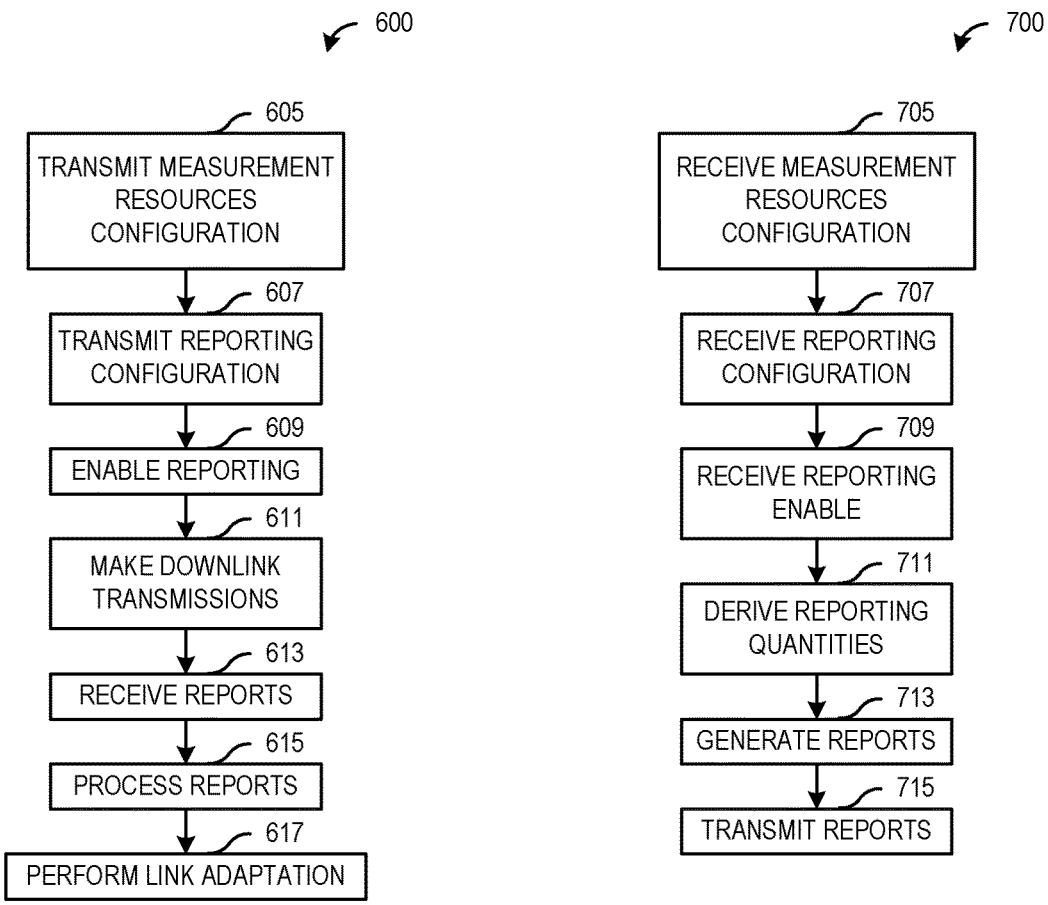
*Fig. 6*
*Fig. 7A*
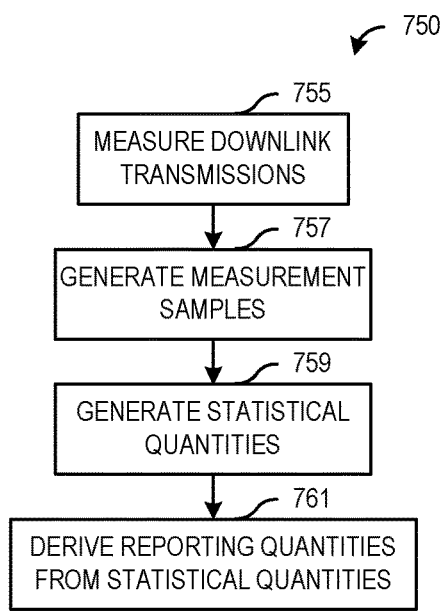
*Fig. 7B*

METHODS AND APPARATUS FOR MEASUREMENT AND REPORT INFORMATION FEEDBACK

CROSS-REFERENCE TO RELATED APPLICATIONS

This application is a continuation of International Application PCT/US2020/044950 filed on Aug. 5, 2020, entitled "Methods and Apparatus for Information Feedback," which claims the benefit of U.S. Provisional Application No. 62/932,234, filed on Nov. 7, 2019, entitled "System and Method for Feedback to Facilitate OLLA for URLLC," which application is hereby incorporated herein by reference in its entirety.

TECHNICAL FIELD

The present disclosure relates generally to methods and apparatus for digital communications, and, in particular embodiments, to methods and apparatus for information feedback.

BACKGROUND

In order to achieve high spectrum efficiency, good link adaptation performance is critical. Link adaptation involves the matching of the modulation and coding, along with other parameters to the condition of the communication link. As an example, in the Third Generation Partnership Project (3GPP) Long Term Evolution (LTE) technical standards, the modulation and coding scheme (MCS) used over a communication link is set according to the quality of the communication link. Link adaptation is dynamic and the parameters of the communication link changes as the condition of the communication link changes.

Link adaptation generally requires channel information at the transmitting device. In time division duplex (TDD) systems, channel reciprocity can be used to obtain channel information for the communication link between the transmitting device to the receiving device by assuming that the communication link is approximately the same as the communication link between the receiving device to the transmitting device, which is useful to acquire the full channel or signal information (e.g., full channel matrix information about the MIMO channel) from the transmitting device to the receiving device, although the interference information is generally unavailable at the transmitting device because channel reciprocity typically does not provide interference information. However, in frequency division duplex (FDD) systems, channel reciprocity cannot be used. In TDD and FDD systems, limited information feedback regarding channel, signal, or interference may be used. However, increased information feedback, typically needed to support more advanced forms of link adaptation, negatively impacts communication performance by increasing communication overhead.

SUMMARY

According to a first aspect, a method implemented by a first device is provided. The method comprising: receiving, by the first device from a second device, a channel state information (CSI) reporting configuration associated with a set of measurement resources and a time-interval configuration, the set of measurement resources comprising at least interference measurement resources, and the time-interval configuration specifying a measurement duration and a reporting time configuration; deriving, by the first device, CSI reporting quantities in accordance with measurements of the set of measurement resources during at least a portion of the measurement duration, the CSI reporting quantities comprising statistical quantities associated with at least interference measurements of the set of measurement resources during the measurement duration; and reporting, by the first device to a third device, the CSI reporting quantities in accordance with the reporting time configuration.

In a first implementation form of the method according to the first aspect, the reporting time configuration comprising at least one of a reporting time, a reporting periodicity, a reporting periodicity and a time offset, a CSI request, or a reporting event trigger.

In a second implementation form of the method according to the first aspect or any preceding implementation form of the first aspect, the deriving the CSI reporting quantities comprising: measuring, by the first device, the set of measurement resources during the at least a portion of the measurement duration; generating, by the first device, measurement samples in accordance with the measurements of the set of measurement resources; and deriving, by the first device, the CSI reporting quantities in accordance with the measurement samples.

In a third implementation form of the method according to the first aspect or any preceding implementation form of the first aspect, the CSI reporting quantities comprising channel quality indicators (CQIs), interference to noise ratios (INRs), log-likelihood ratios (LLRs), signal to noise ratios (SNRs), modulation and coding scheme (MCS), block error rate (BLER), or signal plus interference to noise ratios (SINRs).

In a fourth implementation form of the method according to the first aspect or any preceding implementation form of the first aspect, the statistical quantities comprising at least one of a mean, an average, a maximum, a minimum, a change ($\Delta$), an X-percentile, or a higher order moment, of the CSI reporting quantities, where X is an integer value.

In a fifth implementation form of the method according to the first aspect or any preceding implementation form of the first aspect, the set of measurement resources further comprising at least one of signal measurement resources or channel measurement resources.

In a sixth implementation form of the method according to the first aspect or any preceding implementation form of the first aspect, the CSI reporting quantities further comprising statistical quantities of at least one of signal measurements or channel measurements.

In a seventh implementation form of the method according to the first aspect or any preceding implementation form of the first aspect, further comprising receiving, by the first device, a reporting enable.

In an eighth implementation form of the method according to the first aspect or any preceding implementation form of the first aspect, the reporting enable comprising one of an activating message or an activating indicator.

According to a second aspect, a method implemented by a first device is provided. The method comprising: sending, by the first device to a second device, a CSI reporting configuration associated with a set of measurement resources and a time-interval configuration, the set of measurement resources comprising at least interference measurement resources, and the time-interval configuration specifying a measurement duration and a reporting time configuration; transmitting, by the first device, signals in the set of measurement resources during at least a portion of the measurement duration; and receiving, by the first device from the second device, CSI reporting quantities comprising statistical quantities associated with at least interference measurements of the set of measurement resources during the measurement duration.

In a first implementation form of the method according to the second aspect, the CSI reporting quantities comprising CQIs, INRs, LLRs, SNRs, MCS, BLER, or SINRs.

In a second implementation form of the method according to the second aspect or any preceding implementation form of the second aspect, the statistical quantities comprising at least one of a mean, an average, a maximum, a minimum, a $\Delta$, an X-percentile, or a higher order moment, of the CSI reporting quantities, where X is an integer value.

In a third implementation form of the method according to the second aspect or any preceding implementation form of the second aspect, further comprising transmitting, by the first device, to the second device, a reporting enable.

In a fourth implementation form of the method according to the second aspect or any preceding implementation form of the second aspect, the reporting enable comprising one of an activating message or an activating indicator.

In a fifth implementation form of the method according to the second aspect or any preceding implementation form of the second aspect, the activating message being transmitted in a MAC CE, and the activating indicator being transmitted in a DCI. According to a third aspect, a first device is provided. The first device comprising: one or more processors; and a non-transitory memory storage comprising instructions that, when executed by the one or more processors, cause the first device to: receive, from a second device, a CSI reporting configuration associated with a set of measurement resources and a time-interval configuration, the set of measurement resources comprising at least interference measurement resources, and the time-interval configuration specifying a measurement duration and a reporting duration; derive a CSI reporting quantity in accordance with measurements of the set of measurement resources during at least a portion of the measurement duration, the CSI reporting quantity comprising a statistical quantity associated with at least interference measurements of the set of measurement resources during the measurement duration; and reporting, to a third device, the CSI reporting quantity.

In a first implementation form of the first device according to the third aspect, executing the instructions further causing the first device to: measure the set of measurement resources during the at least a portion of the measurement duration; generate measurement samples in accordance with the measurements of the set of measurement resources; and derive the CSI reporting quantity in accordance with the measurement samples.

In a second implementation form of the first device according to the third aspect or any preceding implementation form of the third aspect, the CSI reporting quantity comprising CQIs, INRs, LLRs, SNRs, MCS, BLER, or SINRs.

In a third implementation form of the first device according to the third aspect or any preceding implementation form of the third aspect, the statistical quantity comprising at least one of mean, average, maximum, minimum, $\Delta$, X-percentile, or higher order moment, of the CSI reporting quantity, where X is an integer value.

In a fourth implementation form of the first device according to the third aspect or any preceding implementation form of the third aspect, the set of measurement resources further comprising at least one of signal measurement resources or channel measurement resources.

In a fifth implementation form of the first device according to the third aspect or any preceding implementation form of the third aspect, the CSI reporting quantity further comprising statistical quantities of at least one of signal measurements or channel measurements.

In a sixth implementation form of the first device according to the third aspect or any preceding implementation form of the third aspect, executing the instructions further causing the first device to receive a reporting enable.

In a seventh implementation form of the first device according to the third aspect or any preceding implementation form of the third aspect, the reporting enable comprising one of an activating message or an activating indicator.

According to a fourth aspect, a first device is provided. The first device comprising: one or more processors; and a non-transitory memory storage comprising instructions that, when executed by the one or more processors, cause the device to: send, to a second device, a CSI reporting configuration associated with a set of measurement resources and a time-interval configuration, the set of measurement resources comprising at least interference measurement resources, and the time-interval configuration specifying a measurement duration and a reporting duration; transmit signals in the set of measurement resources during at least a portion of the measurement duration; and receive, from the second device, a CSI reporting quantity comprising a statistical quantity associated with at least interference measurements of the set of measurement resources during the measurement duration.

In a first implementation form of the first device according to the fourth aspect, the CSI reporting quantity comprising CQIs, INRs, LLRs, SNRs, MCS, BLER, or SINRs.

In a second implementation form of the first device according to the fourth aspect or any preceding implementation form of the fourth aspect, the statistical quantity comprising at least one of mean, average, maximum, minimum, $\Delta$, X-percentile, or higher order moment, of the CSI reporting quantity, where X is an integer value.

In a third implementation form of the first device according to the fourth aspect or any preceding implementation form of the fourth aspect, executing the instructions further causing the device to transmit, to the second device, a reporting enable.

In a fourth implementation form of the first device according to the fourth aspect or any preceding implementation form of the fourth aspect, the reporting enable comprising one of an activating message or an activating indicator.

In a fifth implementation form of the first device according to the fourth aspect or any preceding implementation form of the fourth aspect, the activating message being transmitted in a MAC CE, and the activating indicator being transmitted in a DCI.

An advantage of a preferred embodiment is that methods and apparatus to information feedback sufficient to support ultra-reliable communications with low latency is provided without significantly impacting communication overhead. The methods and apparatus enable the feedback of additional information to allow link adaptation with improved resolution, hence improving communication performance.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a flow diagram of example operations occurring in a gNB participating in link adaptation of a communication link between the gNB and a UE according to example embodiments presented herein;

FIG. 7A illustrates a flow diagram of example operations occurring in a UE participating in link adaptation of a communication link between a gNB and the UE according to example embodiments presented herein;

FIG. 7B illustrates a flow diagram of example operations occurring in a UE deriving a reporting quantity according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
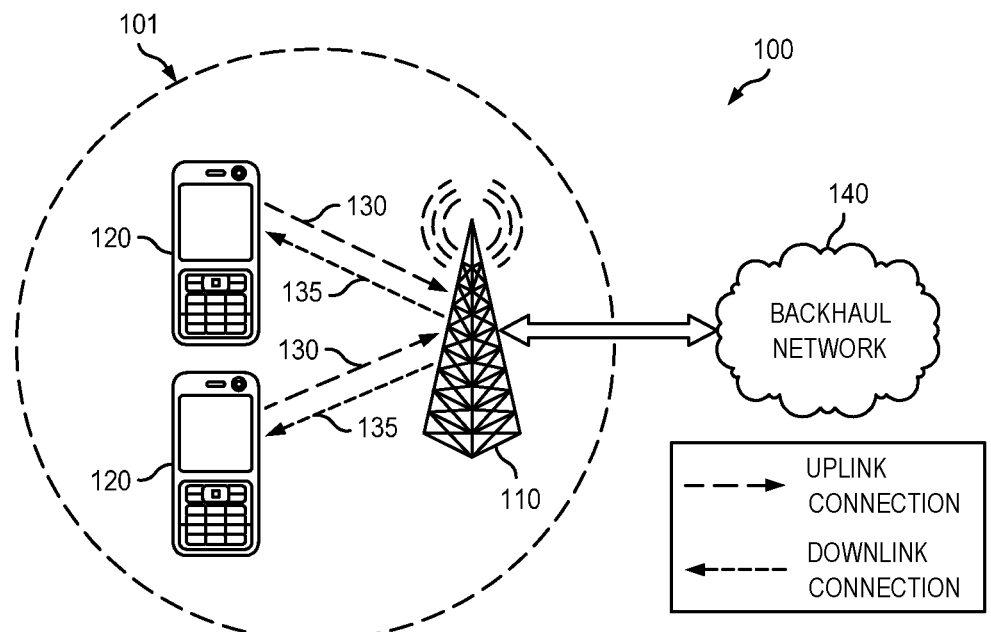
FIG. 1 illustrates an example communications system.

FIG. 1 illustrates an example communications system 100. Communications system wo includes an access node 105 serving user equipments (UEs), such as UEs 120. In a first operating mode, communications to and from a UE passes through access node 105. In a second operating mode, communications to and from a UE do not pass through access node 105, however, access node 105 typically allocates resources used by the UE to communicate when specific conditions are met. Communication between a UE and access node pair occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

In modern communication systems, good link adaptation performance is critical to achieving high spectrum efficiency. In addition to UE channel quality indicator (CQI) feedback and gNB adjustment (due to multi-user pairing and precoding change, for example), outer loop link adaptation (OLLA) is usually used to drive the hybrid automatic repeat request (HARQ) operating point to a desirable 10-20 percent block error rate (BLER) range.

Figure 2:
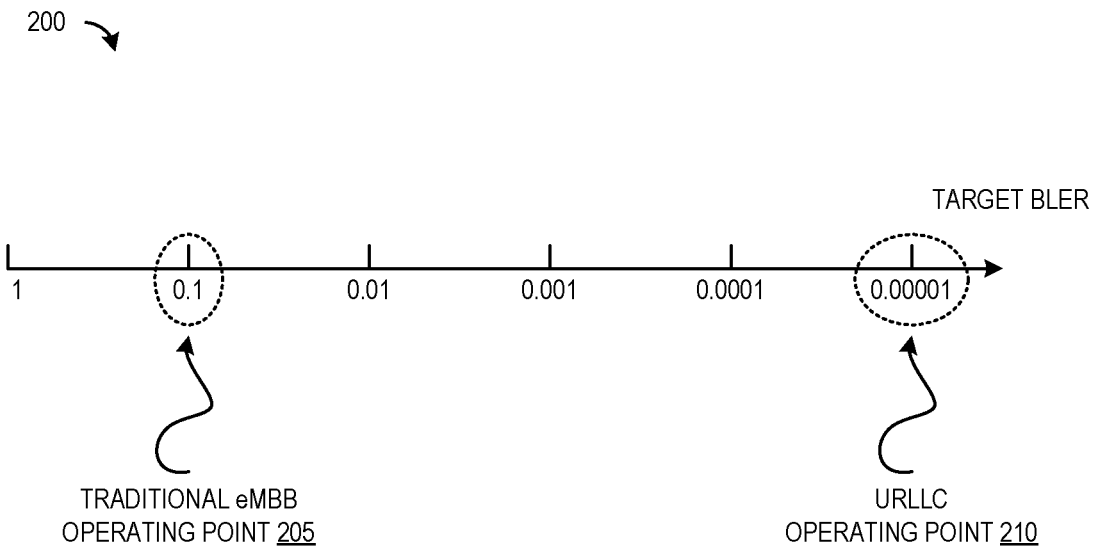
FIG. 2 illustrates a diagram of typical target block error rates (BLERs)

FIG. 2 illustrates a diagram 200 of typical target BLERs. As shown in FIG. 2, a typical target BLER operating point for traditional enhanced mobile broadband (eMBB) communication systems is on the order of 10% BLER 205 (or about 1 block error for every 10 blocks). The modest BLER requirement with tolerance to high latency allows traditional link adaptation to work well. Furthermore, traditional OLLA based solely on acknowledgement/negative-acknowledgement (ACK/NACK) feedback also works well. Each block error typically leads to a NACK and each successful transmission of a block generally leads to an ACK, and the ACK/NACK is typically fed back to the transmitter within a few transmission time intervals (TTIs) (one TTI is a slot in 5G NR and a subframe in 4G LTE, and is usually one millisecond in duration) which is used to drive the OLLA. However, for communication systems supporting ultra-reliable low latency communications (URLLC), the typical target BLER operating point is on the order of 0.001% 210 (or about 1 block error for every 100,000 blocks). Furthermore, the low latency aspect of URLLC requires a very short transmission window, which allows for no re-transmissions or only a small number of re-transmissions. Under such requirements, OLLA based solely on ACK/NACK feedback is very inefficient. The use of ACK/NACK feedback may lead to too many errors or MCS or transmission settings that are too conservative (resulting in low data rates and inefficient use of available network resources).

Figure 3:
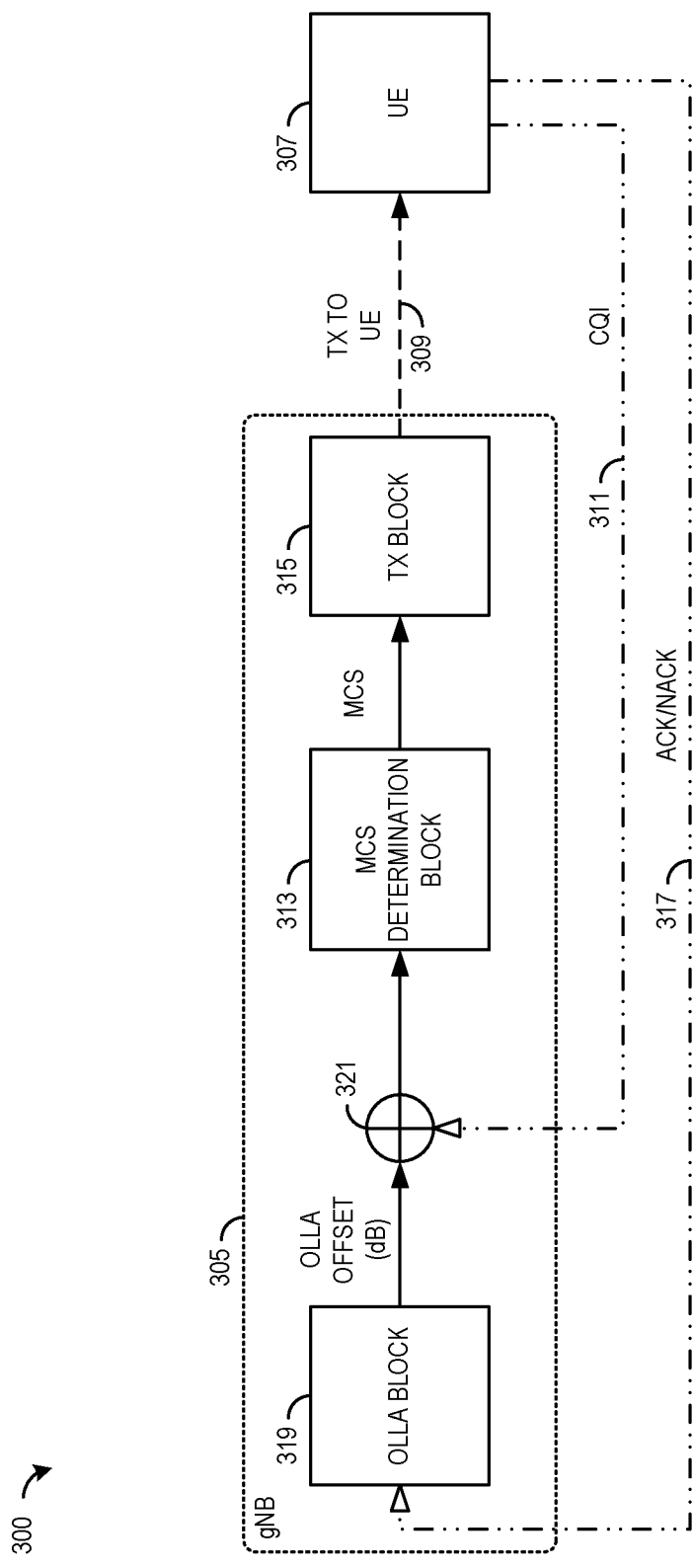
FIG. 3 illustrates a prior art link adaptation system.

FIG. 3 illustrates a prior art link adaptation system 300. Link adaptation system 300 involves a gNB 305 and a UE 307. In practice, gNB 305 transmits wirelessly to UE 307 over a downlink 309 between gNB 305 and UE 307. UE 307 receives and processes the wireless transmission and reports a channel quality indicator (CQI) to gNB 305. The CQI is transmitted over a channel 311 of an uplink between UE 307 and gNB 305. The CQI indicates to gNB 305 the highest modulation and code rate supported by downlink 309 such that the BLER does not exceed a specified value (e.g., 10% for eMBB). The CQI value is typically updated by the UE once every a few to ten TTIs and then reported within a few TTIs of the update.

Conventionally, reference signals (RSs), e.g., channel state information-RSs (CSI-RSs), may be transmitted in measurement resources to UEs for measurement of downlink channels between the UEs and TRPs. The network may specify to the UEs which of the measurement resources is for channel measurement (CM), and which is for interference measurement (IM). Then the UEs make the measurements and derive signal plus interference to noise ratio (SINR)/CQI, as well as other channel state information (CSI) reporting quantities. The SINR/CQI are generally derived based on "an unrestricted observation interval in time", except that in a one-shot SINR/CQI where the channel measurement and/or interference measurement may be derived based on only a single transmission of the measurement resource.

The CQI may be utilized in gNB 305 to set the MCS of downlink 309. As an example, the CQI received by gNB 305 may be provided to a MCS determination block 313 that updates the MCS of downlink 309 based on the CQI. The updated MCS may then be provided to a transmit (TX) block 315 to modulate and encode subsequent transmissions to UE 307.

In addition to the CQI, UE 307 transmits an ACK or a NACK depending on a decoding attempt of a message received from gNB 305. As an example, if UE 307 attempts to decode a message (or a coded block) from gNB 305 and is successful in decoding the message (i.e., no block error), UE 307 transmits an ACK corresponding to the message to gNB 305. Conversely, if UE 307 is unsuccessful in decoding the message (i.e., a block error), UE 307 transmits a NACK corresponding to the message to gNB 305. The ACKs/NACKs are transmitted over a channel 317 to gNB 305, typically within a few TTIs of the reception of the message.

The ACKs/NACKs received from UE 307 may be used in gNB 305 to perform OLLA. As an example, the ACKs/NACKs received by gNB 305 may be provided to an OLLA block 319 that generates an offset value D that is combined (by adder 321, for example) with the CQIs received from UE 307 to adjust the input to MCS determination block 313, which is used to update the MCS of downlink 309. The offset value D may be in dBs and may range from 0 dB and tens of dBs (negative and positive), depending on the ACKs/NACKs and CQIs received from UE 307. In the case of MIMO transmission and reception, multiple codewords may be transmitted or received simultaneously using multiple transmit and receive antennas, and each codeword may have ACKs/NACKs and/or CQI received from UE 307. Separate OLLA loops may be performed for each codeword of MIMO transmission or reception. One codeword may be transmitted on one or multiple MIMO layers, as well as the ACK/NACK feedback and/or CQI, and hence the OLLA loop may be separated for each layer, or joint for the layer(s) for one codeword while separated for other codewords.

In order to have efficient link adaptation, OLLA needs to adapt (in addition to the CQI feedback) the offset value D to cope with uncertain factors that include (but are not limited to) UE measurement or estimation errors of CQI, channel fading, interference condition, and so on.

Generally, a stepsize $\Delta_{ACK}$ value is added to D when an ACK is received and another stepsize $\Delta_{NACK}$ value is subtracted from D when a NACK is received. The ratio of $\Delta_{ACK}$ to $\Delta_{NACK}$ may be related to the target BLER. As an example, if the target BLER is 10%, the number of ACKs to NACKs should be about 9. In other words, on average 1 out of 10 ACK/NACK reports is a NACK. Therefore, to reach a stable condition, $\Delta_{ACK}=9*\Delta_{NACK}$. The OLLA loop dynamics is generally slower than the CQI dynamics because the stepsize $\Delta_{ACK}$ value is usually less than 0.1 dB, and hence it responds slower with a time constant in the range of tens of TTIs. Although this simplistic example does not achieve the best performance, OLLA performs well with such modest target BLERs.

However, with a target BLER of 0.00001 (or 0.001%), $\Delta_{NACK}$ should be roughly 100000*$\Delta_{ACK}$. This implies that, on average, the MCS has to be extremely low most of the time, or $\Delta_{ACK}$ needs to be very small and loses its capability to track the channel or interference condition in the communication system. Either of these implications renders the OLLA generally useless.

Some existing solutions provide faster CQI feedback, which assist in the handling of channel fading and can respond quickly to situations involving blockage and shadowing. However, faster CQI feedback cannot help with interference because interference is very dynamic in nature and is unpredictable. Furthermore, increased CQI report frequency consumes more overhead, especially in situation where there is a low-latency requirement.

Other existing solutions provide ACK/NACK feedback with some other form of link quality report, such as log-likelihood ratios (LLRs), signal plus interference to noise ratios (SINRs), receiver CQI (rxCQI), AMCS, and so forth. Such solutions provide fine or multi-step tuning of the MCS, at the cost of increased overhead. They also do not cope well with interference (again, due to the dynamic and unpredictable nature of interference).

Interference measurement and mitigation has been a challenging issue in wireless communications. Interference is dynamic, unpredictable, and uncontrollable in most cases, and may be generally limited by causality in measurement-reporting-scheduling of communications. For example, the downlink interference caused by a TRP to a UE may only occur when the TRP performs a downlink transmission to a UE served by the TRP. The downlink transmission occurs on a time-frequency resource depending on traffic load or traffic burst of the UE served by the TRP and a TRP scheduling outcome. Because the traffic bursts and the scheduling outcome are generally quite random and may differ from one TTI to the next and differ from one physical resource block (PRB) to the next, the downlink interferences created by the TRP are generally quite bursty and random in nature. The total (sum) interference from a large number of interferers (especially non-dominant interferers) may appear less bursty, but if there exists a small number of dominant interferers, the interference appears to be "on/off" interference, e.g., high in one TTI but low or absent in the next. Wireless channels may experience fading over time, however, the channels are relatively stable in both small time scale (e.g., milliseconds, within the duration of a block fading) and long time scale (e.g., seconds and longer). Comparatively, interference (especially on/off interference) is more dynamic and variable than the channels themselves. Tracking and estimating the channels with reasonable accuracy may be feasible, but tracking the interference in an uncoordinated network is very challenging. It is desirable to develop mechanisms for interference measurement and mitigation with improved performance, which is beneficial for achieving good link adaptation (LA) performance.

According to an example embodiment, methods and apparatus for information feedback supporting ultra-reliable communications with low-latency are provided. Embodiments provide for the feedback of separate information or statistics for channel information and interference information. As an example, signal to noise ratio (SNR) and interference to noise ratio (INR).

Although the discussion presented below focuses on UEs reporting the information feedback to gNBs, the example embodiments are operable for a first communicating device reporting the information feedback to a second communicating device. Therefore, the focus on UEs and gNBs should not be construed as be limiting to the scope of the example embodiments.

In an embodiment, channel information, even in the high mobility situation, is predictable. The SNR may be expressed with a certain confidence level (as an example, SNR within the 95% confidence interval, SNR within the 90% confidence interval, SNR within the 75% confidence interval, SNR within the 50% confidence interval, SNR within the 25% confidence interval, and so on) as a function of time, where the uncertainty is due to the mobility. Channel information with a high confidence interval means that there is more certainty in the accuracy of the reported channel information. For example, a reported SNR with a 75% confidence interval means that there is a 75% certainty that the SNR for the channel will be greater than or equal to the reported value at any given time. Greater margin for variation may be needed in situations where the time between feedback or measurement and application increases. As an example, as the time between feedback or measurement and application increases, the confidence level decreases, i.e., the information ages over time.

In an embodiment, interference, on the other hand, is more dynamic and unpredictable than channel information. However, statistics of interference may be used to help reduce the impact from the dynamic and unpredictable nature of interference. As an example, an interference report comprises INR with a certain confidence level as a function of time, where the uncertainty is due to statistics of multiple INR samples over a period of time or the environment. The interference value may be a margin, for example in dB or in MCS levels, for the interference level.

In an embodiment, in cases where multiple TRPs are supported, separate information or statistics feedback for each TRP is supported. In other words, a UE reports information or statistics feedback for each TRP that is transmitting to the UE. The UE may report the same information or statistics to all TRPs or the UE may report individualized information or statistics to the TRPs. Alternatively, the UE reports a combination of common and individualized information or statistics to the TRPs.

In an embodiment, information related to link blockages is reported quickly. A blockage that totally blocks a link may be handled by communication diversity, where a transmission takes place over multiple links. Fast reporting of blockages helps to quickly adjust link adaptation. The blockage reporting may be particularly useful in higher frequency ranges, e.g., Frequency Range 2 (FR2).

In an embodiment, the UE reports one or more of reporting quantities in an enhanced UE report, where the reporting quantity is reported in one or more statistical or numerical forms. The one or more reporting quantities, obtained at the UE, is reported to the gNB. The one or more reporting quantities is reported in one or more statistical or numerical forms based on multiple samples of the reporting quantities derived from multiple measurement samples over a time interval specified by the network and/or standard specifications.

Example reporting quantities include, but are not limited to:

Signal strength: on a per transmit (TX) port, per receive (RX) port, or per transmission layer basis; and based on channel state information reference signal (CSI-RS) or demodulation reference signal (DMRS) measurements.

Interference strength or INR: on a per RX port, per transmission layer or total basis; and based on DMRS or zero power (ZP) or non-zero power (NZP) interference measurement resource(s) (or resource set or resource configuration) measurements.

SINR or CQI: on a per transmission layer basis or a per TX port basis; With beamformed (precoded) CSI-RSs for measurement, each CSI-RS port may be associated with a transmission layer.

Detection or decoding-related variables: including LLRs, predicted BLER based on current reference signal or data reception.

UE recommended OLLA component: $\Delta$SINR (in addition to gNB maintained OLLA offset value D), $\Delta$MCS, MLR, and so forth.

Time duration of an interference level.

Change rate (e.g., a filtered derivative) of a signal, interference, SINR, or so on.

Receive beam identifier (e.g., receive port identifier) or coefficients.

Example statistical quantities include, but are not limited to:

Instantaneous values.

Nominal mean, median, standard deviation or variance, box plot form (maximum, minimum, X-percentile (such as 95, 90, 75, 50, 25, etc.)), correlation (with another quantity), higher order moments, skewness, kurtosis, dispersion, and so forth.

Distribution type (e.g., normal, lognormal, etc.) and quantized distribution: N bins to cover the cumulative distribution function (CDF), or step size of x dB, for example.

Bin identifier report, percentile report, confidence interval report, tolerance interval report, and so forth.

In an embodiment, any of the reporting quantities and statistical quantities may be combined. As an example, a report comprises a mean or box-plot of INR measured on interference measurement resources enables the gNB to acquire interference statistics. As another example, a report comprises the instantaneous INR that is near a specified maximum.

Figure 4:
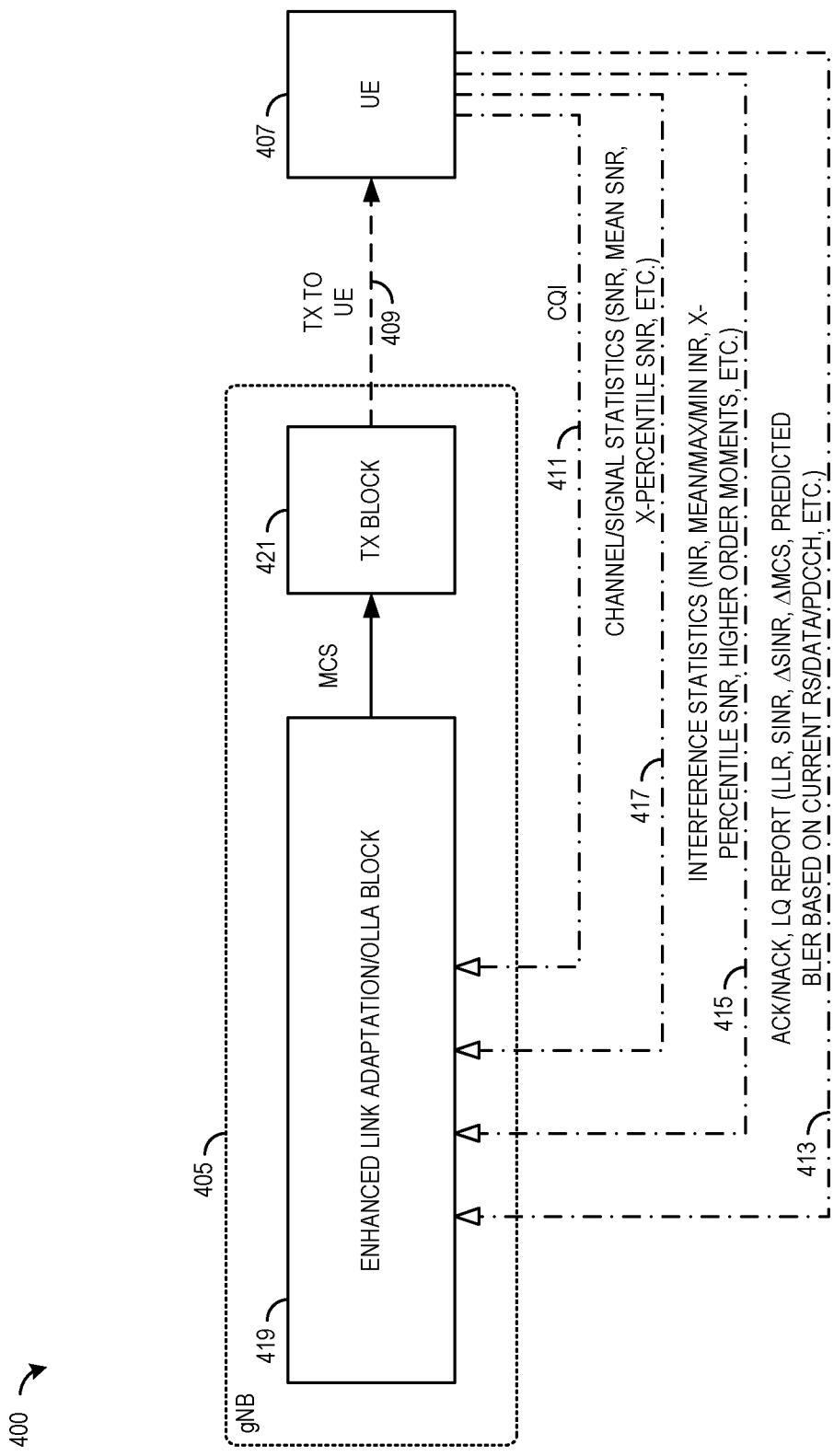
FIG. 4 illustrates an embodiment link adaptation system according to example embodiments presented herein.

FIG. 4 illustrates an embodiment link adaptation system 400. Link adaptation system 400 involves a gNB 405 and a UE 407. In practice, gNB 405 transmits wirelessly to UE 407 over a downlink 409 between gNB 405 and UE 407. UE 407 determines feedback information (including CQI, ACK/NACK reports, link quality reports, reporting quantities related to interference, and reporting quantities related to channel or signal information) and reports the feedback information to gNB 405.

UE 407 receives and processes the wireless transmission and reports a CQI to gNB 405. The CQI is transmitted over a channel 411 of an uplink between UE 407 and gNB 405. UE 407 may also transmit a precoding matrix indicator (PMI), a rank indicator (RI), or a CSI-RS resource indicator (CRI) in addition to the CQI or in place of the CQI. Without loss of generality in the discussion, when CQI is used herein, CQI may also represent any combination of CQI, PMI, RI, CRI, or other CSI quantities.

Furthermore, UE 407 transmits ACK/NACK reports to gNB 405 over a channel 413 of the uplink between UE 407 and gNB 405. In addition to the ACK/NACK reports, UE 407 may transmit a link quality report to gNB 405 over channel 413. The link quality report may include reporting quantities related to the quality of the communication link (downlink 409) between gNB 405 and UE 407. Examples of the reporting quantities included in the link quality report include LLR, SINR, $\Delta$SINR, $\Delta$MCS, $\Delta$LLR, predicted BLER based on received RS/data/control transmissions, and so forth. These link quantities are generally based on the decoding quality of a message. ACK/NACK feedback is a one-bit information about the decoding quality of the message, but other link quantities such as those listed above can provide more information about the decoding quantity. For example, an ACK may tell the network that the link quality is sufficiently good to support the current MCS, but does not tell the network how much margin is available during the decoding of the message. Other link quantities such as the ΔSINR may tell the network that there is a SINR surplus of 5 dB, based on which the network may adjust the MCS of the next transmission. For another example, a NACK may tell the network that the link quality is not sufficiently good to support the current MCS, but does not tell the network how much margin is needed to successfully decode the message. Other link quantities such as the ΔSINR may tell the network that there is a SINR deficit of 5 dB, based on which the network may adjust the MCS of the next transmission. Likewise, ΔMCS, ΔLLR, predicted BLER, etc., may be used in a similar way.

Additionally, UE 407 transmits statistical quantities of reporting quantities related to interference to gNB 405 over a channel 415 of the uplink between UE 407 and gNB 405. The reporting quantities related to interference may include INR, mean/maximum/minimum INR, X-percentile SNR (via NZP CSI-RS resources that actually correspond to an interferer but are transparent to the UE), higher order moments, and so forth. Different from the above discussion in which the reporting quantities may be based on the decoding of one message, these quantities are based on multiple samples of INR/SNR and so on, and obtained from multiple measurement samples over a time interval configured by the network or standard specification.

Also, UE 407 transmits statistical quantities of reporting quantities related to channel or signal information to gNB 405 over a channel 417 of the uplink between UE 407 and gNB 405. The reporting quantities related to channel or signal information may include SNR, mean SNR, X-percentile SNR, and so forth.

In an embodiment, the UE is further configured with noise (or residual interference plus noise) measurement resources (NMRs). The UE is already configured with CMRs and IMRs. With NMRs, the UE can derive and report the SNR (based on measurements of CMRs and NMRs) and INR (based on measurements of IMRs and NMRs). With respect to the NMRs, the UE assumes no transmission of signal or interference (except possibly for residual interference). The NMRs may be transparent to the UE, i.e., they (the NMRs) may be configured as one of the IMRs configured to the UE, and the gNB also configures CSI reporting with the NMRs for "interference measurement", based upon which the UE derives CSI reports and the gNB interprets them as SNRs and INRs.

In an embodiment, the UE is further configured with a reporting configuration in which "CMR" corresponds to interference. In other words, the reported CQI actually corresponds to INR, but this can be transparent to UE. For this reporting configuration, the noise (or residual interference) may be measured on NMRs, or on a ZP CSI-RS configured for interference measurement (or CSI-IM resources as discussed in the technical standards). The "CMR" may be a NZP CSI-RS resource on which the UE assumes each NZP port corresponds to one transmission layer, and the derived report reflects the dominant interference to noise ratio. However, if no IMR is configured for this "CMR" (i.e., no IMR is associated with this "CMR" for CSI reporting), the UE assumes each NZP port corresponds to one transmission layer of "signal" and other interference (residual interference plus noise) is also present on the resource, and the derived report reflects the dominant interference to residual interference ratio. The "CMR" may also be a ZP CSI-RS resource or NZP CSI-RS on which the UE assumes all signals are present, including the NZP signals, and the derived report reflects the total interference to noise ratio.

In an embodiment, the reports are configured. The reports are configured by gNB 405, an operator of the communication system, or a technical standard. The reports may be configured with a reporting time configuration, which may include information such as reporting time, reporting periodicity, reporting periodicity and time offset, a reporting trigger (such as a threshold, a count, an instruction, and so on), etc. As an example, each of the reports may be configured with a different periodicity. For example, the CQI reports are configured with a first periodicity, the ACK/NACK reports are configured with a second periodicity, the link quality reports are configured with a third periodicity, the reports of reporting quantities related to interference are configured with a fourth periodicity, and the reports of reporting quantities related to channel or signal statistics are configured with a fifth periodicity. For another example, the CQI reports are configured with a first periodicity, while the ACK/NACK reports are configured to occur when there is a decoding attempt, the link quality reports are configured to occur when a link quality measurement meets a link quality threshold, the reports of reporting quantities related to interference are configured to occur when an interference measurement meets an interference threshold or has accumulated at least a specified number of samples, and the reports of reporting quantities related to channel or signal statistics are configured to occur when a channel or signal measurement meets a channel or signal threshold or has accumulated at least a specified number of samples. For another example, the CQI reports are configured with a first periodicity, while the ACK/NACK reports are configured to occur with a second periodicity, and the link quality reports, the reports of reporting quantities related to interference, and the reports of reporting quantities related to channel or signal statistics are configured to occur when the UE receives an instruction to report such reporting quantities. For yet another example, the CQI reports are configured with a first periodicity, while the ACK/NACK reports are configured to occur with a second periodicity, and the link quality reports, the reports of reporting quantities related to interference, and the reports of reporting quantities related to channel or signal statistics are configured to occur when the UE detects the occurrence of a specified event. Examples of a specified event may include a specified number of consecutive unsuccessful decoding attempts, a change in successive values of a reporting quantity exceeding a specified change value (e.g., a new interference level exceeding the previously reported maximum value of interference, a change of the previously reported interference distribution, etc.), a change in X-percentile confidence interval, and so forth. The events may be observable/detectable by the UE but typically are not observable or detectable by the gNB unless the UE reports them. In general, the UE reports CSI only according to a gNB trigger or configuration and does not autonomously report CSI. To report the changed CSI reporting quantities due to the events without having to wait for the gNB CSI request or the next reporting instance, the UE may piggyback the information of changed CSI reporting quantities in a physical uplink control channel (PUCCH) (e.g., joint with ACK/NACK feedback) or a physical uplink shared channel (PUSCH) if it is in an ultra-reliable low latency communication (URLLC) session, but if it is not in a URLLC session the UE can wait for the next CSI reporting opportunity as triggered or configured by the gNB. The examples related to report configuration presented herein are for illustrative purposes only and other report configurations are possible.

The reports received by gNB 405 are provided to an enhanced link adaptation and OLLA (ELAO) block 419 configured to process the statistical quantities of the reporting quantities and output a MCS level used to configure TX block 421. TX block 421 modulates and encodes subsequent transmissions to UE 407.

In an embodiment, in a situation where a UE is communicating with multiple gNBs, the link adaptation for each gNB-UE communication link may be implemented as an instantiation of link adaptation system 400.

Figure 5:
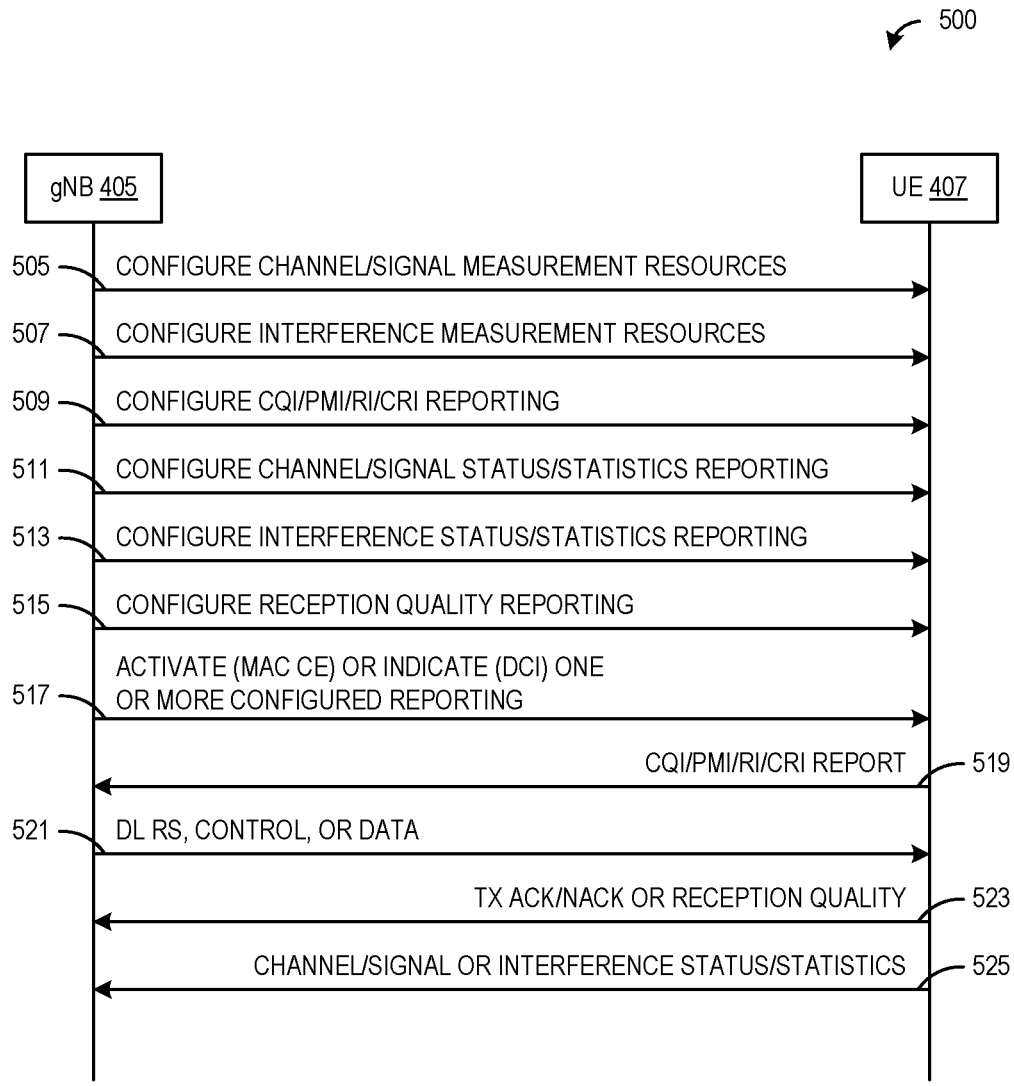
FIG. 5 illustrates a message exchange diagram highlighting messages exchanged between a gNB and a UE as the UE reports feedback information to the gNB according to example embodiments presented herein.

FIG. 5 illustrates a message exchange diagram 500 highlighting messages exchanged between gNB 405 and UE 407 as UE 407 reports feedback information to gNB 405.

gNB 405 configures channel or signal measurement resources (event 505). gNB 405 configures channel or signal measurement resources that UE 407 may measure to determine channel or signal information and sends configuration information to UE 407. The resources configured by the network for channel or signal measurement may comprise NZP CSI-RS resource(s) for channel or signal measurement, for example. gNB 405 configures interference measurement resources (IMRs) (event 507). gNB 405 configures IMRs that UE 407 may measure to determine reporting quantities related to interference and sends configuration information to UE 407. The resources configured by the network for interference measurement generally comprise NZP CSI-RS resource(s) for interference measurement and/or CSI interference measurement (CSI-IM) resource(s), for example. In an embodiment, the configuration information related to the channel or signal measurement resources may be sent in a separate message from the configuration information related to the IMRs. In an embodiment, the configuration information related to the channel or signal measurement resources and the configuration information related to the IMRs may be sent in the same message.

gNB 405 configures CQI reporting (event 509). gNB 405 configures how, when, and where UE 407 is to report CQI and sends configuration information to UE 407. gNB 405 configures channel or signal information reporting (event 511). gNB 405 configures how, when, and where UE 407 is to report channel or signal information and sends configuration information to UE 407. gNB 405 configures interference information reporting (event 513). gNB 405 configures how, when, and where UE 407 is to report interference information and sends configuration information to UE 407. gNB 405 configures reception quality reporting (event 515). gNB 405 configures how, when, and where UE 407 is to report reception quality (e.g., link quality or ACK/NACK) information and sends configuration information to UE 407. In an embodiment, the configuration information related to the CQI reporting, channel or signal information reporting, interference information reporting, and reception quality reporting may be sent separate messages. In an embodiment, the configuration information related to the CQI reporting, channel or signal information reporting, interference information reporting, and reception quality reporting may be sent in the same message. In an embodiment, the configuration information related to the CQI reporting, channel or signal information reporting, interference information reporting, and reception quality reporting may be sent in multiple messages, with one or more messages including only configuration information for a single report type, while one or more messages including configuration information for multiple report types.

In an embodiment, the configuration information for a particular report type specifies when UE 407 is to report the information. As an example, the configuration information specifies a periodicity of the report type. As another example, the configuration information specifies a reporting threshold for the report type. As yet another example, the configuration information specifies an event triggering a report of the report type. As yet another example, the configuration information specifies an instruction that will trigger a report of the report type. As yet another example, the configuration information includes more than one of the above listed examples.

In an embodiment, the configuration information for a particular report type specifies a resource UE 407 is to use when reporting the information. In an embodiment, the configuration information for a particular report type specifies a sequence UE 407 is to use when reporting the information.

gNB 405 enables reporting (event 517). gNB 405 enables reporting by UE 407 by activating (by transmitting a media access control (MAC) control element (CE) message) or indicating (by transmitting a downlink control indicator (DCI) message) to UE 407, for example. gNB 405 may enable a subset of the configured reports. As an example, gNB 405 may enable CQI reporting only. As another example, gNB 405 may enable CQI reporting, along with reception quality reporting and interference information quality reporting. As yet another example, gNB 405 may enable CQI reporting, along with reception quality reporting and channel or signal information quality reporting. Other combinations of reporting enablement are possible.

UE 407 transmits a CQI report (event 519). The CQI report transmitted by UE 407 is in accordance with the configuration information for CQI reports configured by gNB 405. gNB 405 transmits packets (event 521). The packets transmitted by gNB 405 may include downlink RS, control information, data, or a combination thereof. UE 407 transmits a reception quality report (event 523). The reception quality report may include an ACK/NACK, a link quality information, or both an ACK/NACK and the link quality information. UE 407 transmits additional reports (event 525). The additional reports may include a channel or signal information, interference information, or both the channel or signal information and the interference information.

As shown in FIG. 5, UE 407 is configured to report CQI, reception quality information, channel or signal information, and interference information. However, in situations where UE 407 is configured to report less information, UE 407 may not transmit as many reports. As an example, if gNB 405 does not enable interference information reports, UE 407 may not transmit interference information reports in event 525. Therefore, the discussion of UE 407 transmitting CQI, reception quality information, channel or signal information, and interference information should not be construed as being limit to the scope of the example embodiments.

Although the discussion of FIG. 5 presents the situation where a single device (i.e., gNB 405) performs the configuration and receives the reports, the example embodiments presented herein are operable in situations where a first device performs the configuration and a second device receives the reports. Therefore, the discussion of a single device performing the configuration and receiving the reports should not be construed as being limiting to the scope of the example embodiments.

FIG. 6 illustrates a flow diagram of example operations 600 occurring in a gNB participating in link adaptation of a communication link between the gNB and a UE. Operations 600 may be indicative of operations occurring in a gNB as the gNB participates in link adaptation of a communication link between the gNB and a UE.

Operations 600 begin with the gNB transmitting information related to measurement resource configurations (block 605). The measurement resources may be of different measurement resource types, including signal measurement resources, interference measurement resources, channel measurement resources, etc. The measurement resource configurations may specify, for each measurement resource type, the measurement resources, and a time-interval configuration that specifies the time duration for the measurements. The measurement resource configurations may be associated with reporting quantities. Each reporting quantity may be a statistical quantity associated with the measurement of a particular measurement resource type (e.g., signal measurement resources, interference measurement resources, channel measurement resources, etc.). The gNB may transmit the information associated with the various measurement resources separately or in a combined message.

The gNB transmits information related to reporting configurations (block 607). The information may include reporting configurations for CQI reporting, channel or signal measurements reporting, interference measurements reporting, reception quality measurements reporting, or a combination thereof. The reporting configurations may include information regarding which reporting quantities to report, which statistical quantities of the reporting quantities to report, reporting frequencies, reporting intervals, report triggering thresholds, report triggering events, report triggering instructions, and so on. The gNB may transmit the information associated with the various reporting configurations separately or in a combined message. Alternatively, the gNB may transmit the information associated with some reporting configurations in separate messages, while transmitting the information associated with other reporting configurations in a combined message.

The gNB enables reporting (block 609). The gNB may enable reporting by transmitting a MAC CE message to activate the reporting. The gNB may enable reporting by transmitting an indicator in a DCI message to activate the reporting. The gNB may enable a subset of the configured reports, meaning that some or all of the configured reporting will be performed by the UE. The gNB makes downlink transmissions (block 611). The downlink transmissions may include downlink RSs, control information, data, or a combination thereof.

The gNB receives reports (block 613). The gNB receives reports from the UE in accordance with the report configurations and the enabled reports. The gNB may receive CQI reports, channel or signal measurement reports, interference measurement reports, reception quality reports, or a combination thereof. The reports may be individual reports or a combination thereof. As an example, if two reports are configured to occur at the same time, the two reports may be transmitted in a single message. The gNB processes reports (block 615). The gNB processes the information included in the reports. The gNB performs link adaptation (block 617). The gNB (e.g., ELAO block of the gNB) adjusts the MCS in accordance with the processed reports, for example. The gNB may also trigger the UE to update certain measurements and send updated measurement information.

FIG. 7A illustrates a flow diagram of example operations 700 occurring in a UE participating in link adaptation of a communication link between a gNB and the UE. Operations 700 may be indicative of operations occurring in a UE as the UE participates in link adaptation of a communication link between a gNB and the UE.

Operations 700 begin with the UE receiving information related to measurement resource configurations (block 705). The measurement resources may be of different measurement resource types, including signal or channel measurement resources (CMRs), IMRs, etc. The measurement resource configurations may specify, for each measurement resource type, the measurement resources, a time-interval configuration that specifies the time duration for the measurements. The measurement resource configurations may be associated with reporting quantities. Each reporting quantity may be a statistical quantity associated with the measurement of a particular measurement resource type (e.g., signal measurement resources, interference measurement resources, channel measurement resources, etc.). The UE may receive the information associated with the various measurement resource types separately or in a combined message. Alternatively, the UE may receive the information associated with some measurement resource configurations in separate messages, while receiving the information associated with other measurement resource configurations in a combined message.

The UE receives information related to reporting configurations (block 707). The information may include reporting configurations for CQI reporting, channel or signal measurements reporting, interference measurements reporting, reception quality measurements reporting, or a combination thereof. The reporting configurations may include information regarding which reporting quantities to report, which statistical quantities of the reporting quantities to report, reporting frequencies, reporting intervals, report triggering thresholds, report triggering events, report triggering instructions, and so on. The UE may receive the information associated with the various reporting configurations separately or in a combined message. Alternatively, the UE may receive the information associated with some reporting configurations in separate messages, while receiving the information associated with other reporting configurations in a combined message.

The UE receives the enabling of reporting (block 709). The enabling of reporting may be accomplished when the UE receives a MAC CE message activating the reporting. The enabling of reporting may be accomplished when the UE receives a DCI message activating the reporting. A subset of the configured reports may be enabled, meaning that some or all of the configured reporting will be performed by the UE.

The UE derives reporting quantities (block 711). The reporting quantities may be derived from measurement samples of downlink transmissions received by the UE, where the measurement samples are made of measurement resources, as configured by the measurement resource configurations and the reporting configurations. The downlink transmissions may include downlink RSs, control information, data, or a combination thereof. The UE generates statistical quantities from the measurement samples and generates the reporting quantities from the statistical quantities. A detailed description of the derivation of the reporting quantities is provided below.

The UE generates reports (block 713). The reports include the reporting quantities, potentially with other information as specified in the reporting configurations received by the UE. The UE transmits the reports (block 715). The reports are transmitted in accordance with the reporting configurations, which may specify which resources to use to transmit the reports, which codes to use (if any), and so on.

Although the discussion of FIG. 7A presents a situation where the UE receives the configuration and sends the reports to a single device, the example embodiments presented herein are operable in situations where the UE receives the configuration from one device and sends the report to a different device. Therefore, the discussion of receiving configurations and sending reports to a single device should not be construed as being limiting to the scope of the example embodiments.

FIG. 7B illustrates a flow diagram of example operations 750 occurring in a UE deriving a reporting quantity. Operations 750 may be indicative of operations occurring in a UE as the UE derives a reporting quantity. Operations 750 may be an example embodiment of block 711 of FIG. 7A.

Operations 750 begin with the UE measuring downlink transmissions (block 755). The UE may make measurements of configured measurement resources, as configured by the measurement resource configurations. As an example, the measurement resource configurations may specify which resources to measure, which type of measurements to make, a time duration when to make the measurements, number of measurement samples, and so forth. The UE generates measurement samples (block 757). The measurement samples may be generated from the measurements of the measurement resources. Examples of the types of measurement samples include measurement samples on CMRs and measurement samples on IMRs (such as CSI-IM resources and/or NZP CSI-RS resources for interference measurement). Based on these measurement samples, the UE generates samples of the reporting quantities, e.g., INR samples derived from measurement samples on IMR (in which the interference (I) component may be from the NZP CSI-RS resources for interference measurement and the noise (N) component may be from the CSI-IM resources), SINR samples derived from measurement samples on CMRs, and so on. The UE generates statistical quantities (block 759). The statistical quantities may be generated from the measurement samples directly or from the reporting quantity samples. As an example, averages, means, confidence intervals, X-percentiles, etc., may be generated from measurement samples or from the reporting quantity samples. The UE derives the reporting quantities from the statistical quantities (block 761). The UE may apply mathematical functions or operations to the statistical quantities to derive the reporting quantities, for example.

In an example embodiment, the UE is configured with IMRs and derives interference measurement samples in interference measurement (IM) instances over a period of time. In one time instance there could be multiple samples as well. For example, in one TTI with IMRs over multiple PRBs, resource block groups (RBGs), subbands, or the like, the UE may derive one measurement sample on each of the frequency units. Based on these samples over multiple time or frequency resources, the UE derives statistical quantities and reports the minimum (0-percentile), 25-percentile, 50-percentile, 75-percentile, (or any other percentile), the maximum (100-percentile), and optionally the mean values of the samples. The reporting is once per specified interval, e.g., 40 ms. The UE receives a URLLC transmission and when sending an ACK/NACK, the UE also indicates that the instantaneous interference falls between a specified range (e.g., 50-percentile and 75-percentile). The gNB adjusts the MCS in accordance with the 75-percentile of the interference. For another example, the UE is configured to report the maximum interference level over multiple time or frequency resources, and the gNB can set the link adaptation according to this maximum which is not overly conservative and may almost certainly lead to a successful transmission. The statistical quantities and percentile values presented are for illustrative purposes and are not intended to be exhaustive examples. Exactly how the network may utilize the reported information does not need to be specified in standards but can be done on an implementation basis, such as according to the examples given above. The network may need to take into account the time stamps of the report during link adaptation, e.g., when the reported information ages over time, the gNB should weigh its validity less, and may need to apply more margin over time.

When a time duration, a number of slots, or a number of measurement resource instances are configured for a CSI measurement and report, the reference resource for the CSI report may not be limited to a specific slot. The reference resource in time domain of the CSI report comprises the slots within the configured time duration, the number of slots, or the slots with the measurement resources. In frequency domain, the CSI reference resource is defined by the group of downlink PRBs corresponding to the band to which the derived CSI relates.

In one embodiment where a CQI is reported, a single PDSCH transport block with a combination of modulation scheme, target code rate and transport block size corresponding to the CQI index, and occupying a group of downlink PRBs of the frequency domain CSI reference resource, may be received with a transport block error probability not exceeding a specified (or configured) error rate averaged over the slots of the time domain CSI reference resource. As an example, the error rate can be 0.1, or 0.00001, or any other specified value.

In another embodiment where a CQI is reported, a single PDSCH transport block with a combination of modulation scheme, target code rate and transport block size corresponding to the CQI index, and occupying a group of downlink PRBs of the frequency domain CSI reference resource, may be received with a transport block error probability not exceeding a specified (or configured) error rate over any of the slot of the time domain CSI reference resource.

In yet another embodiment where a CQI is reported, a single PDSCH transport block with a combination of modulation scheme, target code rate and transport block size corresponding to the CQI index, and occupying a group of downlink PRBs of the frequency domain CSI reference resource, may be received with a transport block error probability not exceeding a specified (or configured) error rate over one specific slot of the time domain CSI reference resource, and the one specific slot of the time domain CSI reference resource is specified in a standard, in a RRC configuration, a MAC CE, or a DCI. As an example, the one specific slot may be specified as the last slot of the time domain CSI reference resource, a slot with a specified slot offset from the last slot of the time domain CSI reference resource, and so on.

Within the configured time duration of CSI measurement and report, multiple CMR instances and multiple IMR instances may present. For CSI reports based on both signal/channel measurement and interference measurement, a signal measurement over a CMR instance may pair with an interference measurement over any of the IMR instance. In an embodiment, in a situation with n CMR instances and m IMR instances present in the configured time duration of the CSI measurement and report, then n signal/channel measurements each over a CMR instance and m interference measurements each over an IMR instance can be paired to generate a CSI value which results in n times m CSI values. The reported CSI value is then selected from these n times m values according to the configured statistic for the report.

In another embodiment, in a situation with n CMR instances and m IMR instances present in the configured time duration of the CSI measurement and report, then one signal/channel measurement over the n CMR instances and m interference measurements each over an IMR instance can be paired to generate a CSI value which results in m CSI values. The reported CSI value is then selected from these m values according to the configured statistic for the report. The one signal/channel measurement out of the n CMR instances is specified in a standard, in a RRC configuration, a MAC CE, or a DCI. As an example, the one signal/channel measurement may be specified as the most recent signal/channel measurement, the worst signal/channel measurement, a signal/channel measurement satisfying a criterion such as below a threshold, and so on. The reported CSI value is selected as specified in a standard, in a RRC configuration, a MAC CE, or a DCI. As an example, the reported CSI value may be specified as, e.g., the most recent CSI value, the worst CSI value, a CSI value satisfying a criterion such as below a threshold, and so on.

In another embodiment, in a situation with n CMR instances and m IMR instances present in the configured time duration of the CSI measurement and report, then n signal/channel measurement each over a CMR instances and interference measurements over the m IMR instance can be paired to generate a CSI value which results in n CSI values. The reported CSI value is then selected from these n values according to the configured statistic for report.

If the UE reports the instantaneous interference to be between the 75-percentile and the maximum interference values, the gNB sets the MCS in accordance with the maximum interference value. If the UE reports the instantaneous interference to be greater than the maximum interference value, the gNB sets the MCS in accordance with the lowest supported MCS. The gNB may also trigger (by sending an instruction) to report updated IM statistics or values.

The instantaneous interference values from the UE may be reported relative to a percentile value, e.g., +2 dB with respect to the 25-percentile interference value, −4 dB with respect to the maximum interference value, half-way between the 25-percentile and 50-percentile percentile interference values, and so on, to reduce communication overhead and increase accuracy. The relative values and percentile values presented are for illustrative purposes and are not intended to be exhaustive examples.

In another example embodiment, the UE is configured to report a UE recommended OLLA component (or a Δ value or a margin) with respect to a reference or nominal value. As an example, the UE may report an ACK with a 3 dB margin with respect to the decoding success or failure threshold, and the gNB may apply a 2 dB offset to the OLLA. As an example, the UE may report a NACK and a −3 dB margin (e.g., a 3 dB SINR deficit) with respect to the decoding success or failure threshold, and the gNB may apply a −4 dB offset to the OLLA. As an example, the UE may report 2 level MCS margin with respect to the decoding success or failure threshold, and the gNB can increase the MCS by 1 level. As an example, the UE may report −2 MCS margin with respect to the decoding success or failure threshold, and the gNB can decrease the MCS by 3 levels. In the examples presented above, the decoding success or failure threshold may be replaced with a target BLER (e.g., a 0.001% target BLER) or another value. The OLLA components and margins presented are for illustrative purposes and are not intended to be exhaustive examples.

In another embodiment, the UE is configured to report a signal change rate, e.g., −2 dB/s, 1 dB/s, and so on, and the gNB can predict the SINR. The signal change rates presented are for illustrative purposes and are not intended to be exhaustive examples.

In another embodiment, the UE is configured to report the distribution or statistics of the LLRs or the BLER.

In another embodiment, the UE is configured to report an instantaneous interference value experienced at the demodulator, along with a confidence interval for the value. The confidence interval may be the 95%, 90%, etc., or a confidence interval specified in the technical standards, the operator of the communication system, or signaled by the gNB. The UE may also be configured to not report interference statistics. In such a situation, the UE may still maintain the interference statistics. The gNB may set the link adaptation based on a worst case (i.e., conservative operation) of the reported confidence interval. The UE may report signal strength, SINR, CQI, MCS, and so forth, instead of the instantaneous interference value. The instantaneous interference values presented are for illustrative purposes and are not intended to be exhaustive examples.

In another embodiment, the UE is configured to report time statistics of high interference levels. As an example, the INR level above 25 dB occurs once and lasts 3 ms. As another example, the INR level above 20 dB occurs only 20 times since the last report and lasts 4 ms each occurrence. The time statistics presented are for illustrative purposes and are not intended to be exhaustive examples.

In an example embodiment, the UE is configured with CMRs and IMRs and derives CQI or SINR samples over a period of time. In one time instance there could be multiple samples as well. For example, in one TTI with CMRs and IMRs over multiple PRBs, RBGs, subbands, or the like, the UE may derive one CQI or SINR sample on each of the frequency units. Based on these samples over multiple time or frequency resources, the UE derives statistical quantities and reports the minimum (0-percentile), 25-percentile, 50-percentile, 75-percentile, (or any other percentile), the maximum (100-percentile), and optionally the mean values of the samples. The reporting is once per specified interval, e.g., 40 ms, or could be triggered by the gNB's CSI request. The UE receives a URLLC transmission and when sending an ACK/NACK, the UE also indicates that the instantaneous CQI or SINR falls between a specified range (e.g., 50-percentile and 75-percentile). The gNB adjusts the MCS in accordance with the 75-percentile of the interference. For another example, the UE is configured to report the minimum CQI or SINR over multiple time/frequency resources, and the gNB can set the link adaptation according to this minimum which is not overly conservative and may almost certainly lead to a successful transmission. In other words, the UE may report conservative CSI information so that the network can set a conservative MCS level with a certain margin. For example, in addition to regular CQI report (e.g., 20 dB), the UE may report the lowest CQI over a set of time resources and/or a set of frequency resources (e.g., 15 dB). Then the network may select a MCS level corresponding to 10~15 dB but not more conservative. The time resource information or the PRB or subband information associated with the lowest CQI can also be reported, e.g., the lowest CQI of 15 dB was seen 20 ms ago on PRBs #5~#9.

Likewise, the UE may report the lowest channel measurement (e.g., SNR) over a set of time resources and/or a set of frequency resources, and the UE may report the highest interference measurement (e.g., INR) over a set of time resources and/or a set of frequency resources, together with the information of the time or frequency resource on which the worst case was observed. The statistical quantities and percentile values presented are for illustrative purposes and are not intended to be exhaustive examples.

In an embodiment, the enhancement CSI reports associated with URLLC may be assigned with higher priority when a collision with other transmissions has occurred or are possible. For example, if a URLLC-related CSI report for a first carrier collides with a non-URLLC CSI report for a second carrier, the latter is dropped. For another example, if a URLLC-related CSI report for a first carrier collides with a non-URLLC ACK/NACK feedback for a second carrier, the latter is dropped. For another example, if a URLLC-related CSI report for a first carrier collides with a non-URLLC SRS transmission on a second carrier, the latter is dropped. And so on and so forth. The first and second carriers may be same or different. In an embodiment, when the UE is not provided simultaneous HARQ-ACK-CSI and the URLLC-related CSI collides with HARQ feedback, a new field for CSI may be included in the PUCCH with HARQ feedback, or HARQ feedback is included in the PUSCH transmission which includes both the HARQ feedback and CSI report in the PUSCH. A URLLC-related CSI may be a CSI associated with a higher priority index, a CSI associated with a URLLC indicator, a CSI according to the embodiments in this application (e.g., with separated channel or interference reporting, with statistical information reporting), a CSI associated with repeated reporting (to increase CSI reporting reliability), and so on.

Figure 8:
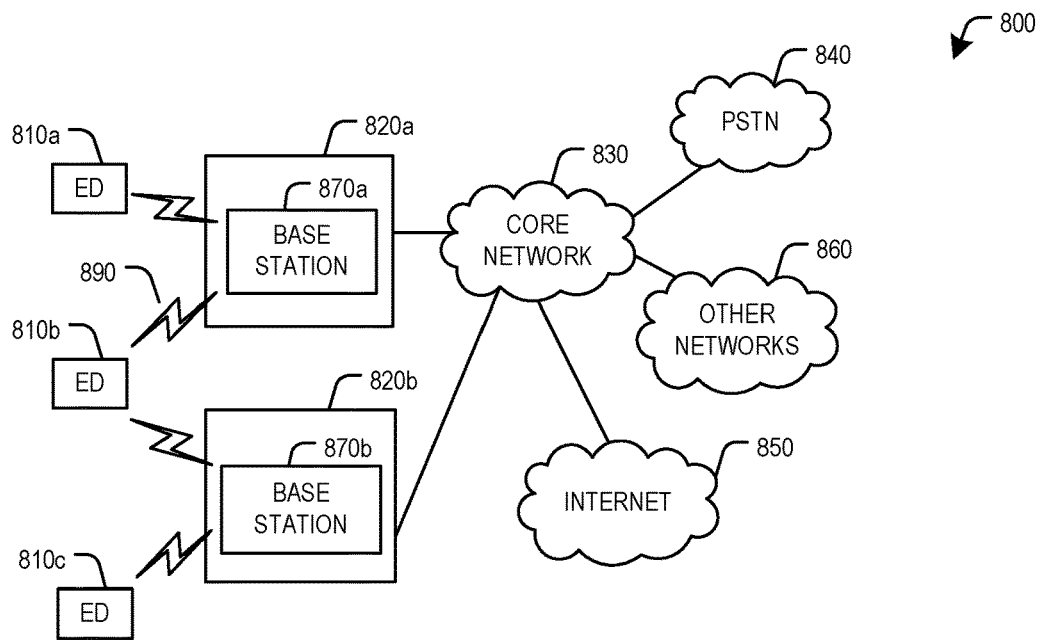
FIG. 8 illustrates an example communication system according to example embodiments presented herein.

FIG. 8 illustrates an example communication system 800. In general, the system 800 enables multiple wireless or wired users to transmit and receive data and other content. The system 800 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 800 includes electronic devices (ED) 810a-810c, radio access networks (RANs) 820a-820b, a core network 830, a public switched telephone network (PSTN) 840, the Internet 850, and other networks 860. While certain numbers of these components or elements are shown in FIG. 8, any number of these components or elements may be included in the system 800.

The EDs 810a-810c are configured to operate or communicate in the system 800. For example, the EDs 810a-810c are configured to transmit or receive via wireless or wired communication channels. Each ED 810a-810c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 820a-820b here include base stations 870a-870b, respectively. Each base station 870a-870b is configured to wirelessly interface with one or more of the EDs 810a-810c to enable access to the core network 830, the PSTN 840, the Internet 850, or the other networks 860. For example, the base stations 870a-870b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 810a-810c are configured to interface and communicate with the Internet 850 and may access the core network 830, the PSTN 840, or the other networks 860.

In the embodiment shown in FIG. 8, the base station 870a forms part of the RAN 820a, which may include other base stations, elements, or devices. Also, the base station 870b forms part of the RAN 820b, which may include other base stations, elements, or devices. Each base station 870a-870b operates to transmit or receive wireless signals within a particular geographic region or area, sometimes referred to as a "cell." In some embodiments, multiple-input multiple-output (MIMO) technology may be employed having multiple transceivers for each cell.

The base stations 870a-870b communicate with one or more of the EDs 810a-810c over one or more air interfaces 890 using wireless communication links. The air interfaces 890 may utilize any suitable radio access technology.

It is contemplated that the system 800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 820a-820b are in communication with the core network 830 to provide the EDs 810a-810c with voice, data, application, Voice over Internet Protocol (VoIP), or other services. Understandably, the RANs 820a-820b or the core network 830 may be in direct or indirect communication with one or more other RANs (not shown). The core network 830 may also serve as a gateway access for other networks (such as the PSTN 840, the Internet 850, and the other networks 860). In addition, some or all of the EDs 810a-810c may include functionality for communicating with different wireless networks over different wireless links using different wireless technologies or protocols. Instead of wireless communication (or in addition thereto), the EDs may communicate via wired communication channels to a service provider or switch (not shown), and to the Internet 850.

Although FIG. 8 illustrates one example of a communication system, various changes may be made to FIG. 8. For example, the communication system 800 could include any number of EDs, base stations, networks, or other components in any suitable configuration.

Figure 9A:
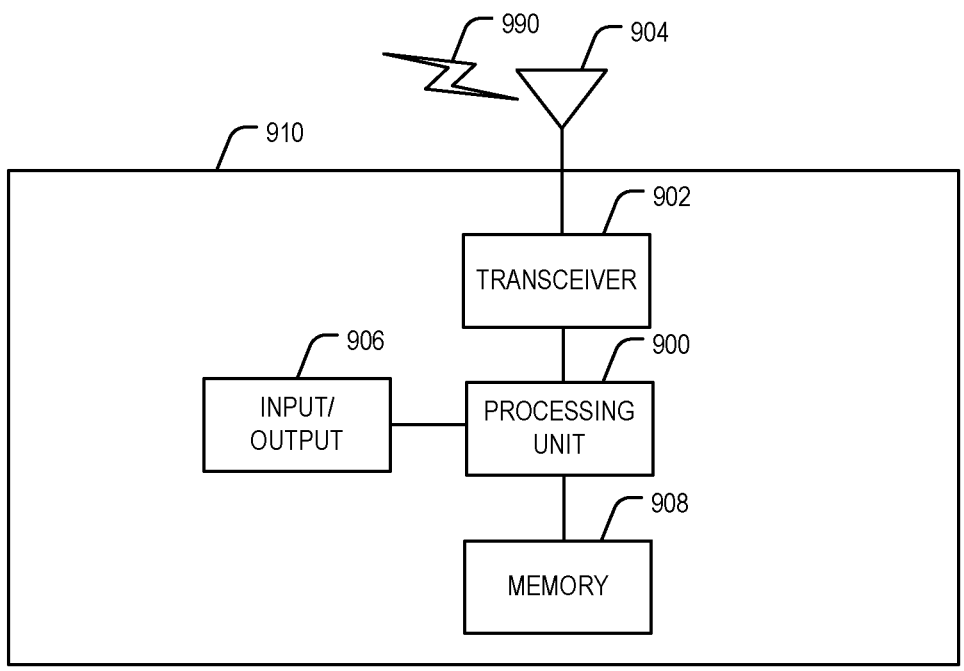
FIGS. 9A and 9B illustrate example devices that may implement the methods and teachings according to this disclosure.
Figure 9B:
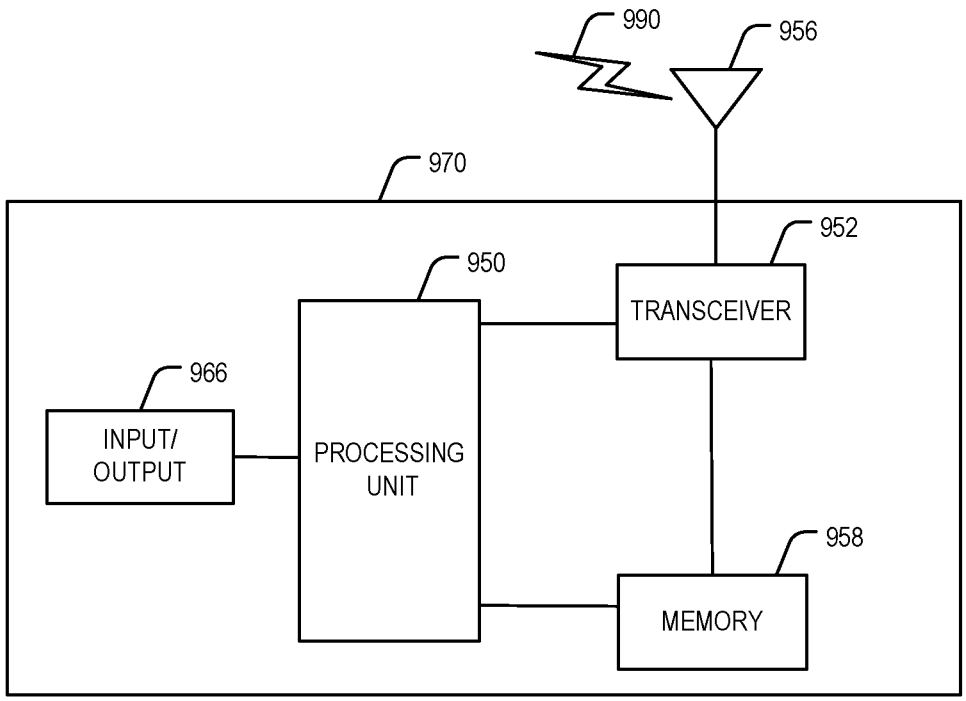

FIGS. 9A and 9B illustrate example devices that may implement the methods and teachings according to this disclosure. In particular, FIG. 9A illustrates an example ED 910, and FIG. 9B illustrates an example base station 970. These components could be used in the system 800 or in any other suitable system.

As shown in FIG. 9A, the ED 910 includes at least one processing unit 900. The processing unit 900 implements various processing operations of the ED 910. For example, the processing unit 900 could perform signal coding, data processing, power control, input/output processing, or any other functionality enabling the ED 910 to operate in the system 800. The processing unit 900 also supports the methods and teachings described in more detail above. Each processing unit 900 includes any suitable processing or computing device configured to perform one or more operations. Each processing unit 900 could, for example, include a microprocessor, microcontroller, digital signal processor, field programmable gate array, or application specific integrated circuit.

The ED 910 also includes at least one transceiver 902. The transceiver 902 is configured to modulate data or other content for transmission by at least one antenna or NIC (Network Interface Controller) 904. The transceiver 902 is also configured to demodulate data or other content received by the at least one antenna 904. Each transceiver 902 includes any suitable structure for generating signals for wireless or wired transmission or processing signals received wirelessly or by wire. Each antenna 904 includes any suitable structure for transmitting or receiving wireless or wired signals. One or multiple transceivers 902 could be used in the ED 910, and one or multiple antennas 904 could be used in the ED 910. Although shown as a single functional unit, a transceiver 902 could also be implemented using at least one transmitter and at least one separate receiver.

The ED 910 further includes one or more input/output devices 906 or interfaces (such as a wired interface to the Internet 850). The input/output devices 906 facilitate interaction with a user or other devices (network communications) in the network. Each input/output device 906 includes any suitable structure for providing information to or receiving information from a user, such as a speaker, microphone, keypad, keyboard, display, or touch screen, including network interface communications.

In addition, the ED 910 includes at least one memory 908. The memory 908 stores instructions and data used, generated, or collected by the ED 910. For example, the memory 908 could store software or firmware instructions executed by the processing unit(s) 900 and data used to reduce or eliminate interference in incoming signals. Each memory 908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 9B, the base station 970 includes at least one processing unit 950, at least one transceiver 952, which includes functionality for a transmitter and a receiver, one or more antennas 956, at least one memory 958, and one or more input/output devices or interfaces 966. A scheduler, which would be understood by one skilled in the art, is coupled to the processing unit 950. The scheduler could be included within or operated separately from the base station 970. The processing unit 950 implements various processing operations of the base station 970, such as signal coding, data processing, power control, input/output processing, or any other functionality. The processing unit 950 can also support the methods and teachings described in more detail above. Each processing unit 950 includes any suitable processing or computing device configured to perform one or more operations. Each processing unit 950 could, for example, include a microprocessor, microcontroller, digital signal processor, field programmable gate array, or application specific integrated circuit.

Each transceiver 952 includes any suitable structure for generating signals for wireless or wired transmission to one or more EDs or other devices. Each transceiver 952 further includes any suitable structure for processing signals received wirelessly or by wire from one or more EDs or other devices. Although shown combined as a transceiver 952, a transmitter and a receiver could be separate components. Each antenna 956 includes any suitable structure for transmitting or receiving wireless or wired signals. While a common antenna 956 is shown here as being coupled to the transceiver 952, one or more antennas 956 could be coupled to the transceiver(s) 952, allowing separate antennas 956 to be coupled to the transmitter and the receiver if equipped as separate components. Each memory 958 includes any suitable volatile or non-volatile storage and retrieval device(s). Each input/output device 966 facilitates interaction with a user or other devices (network communications) in the network. Each input/output device 966 includes any suitable structure for providing information to or receiving/providing information from a user, including network interface communications.

Figure 10:
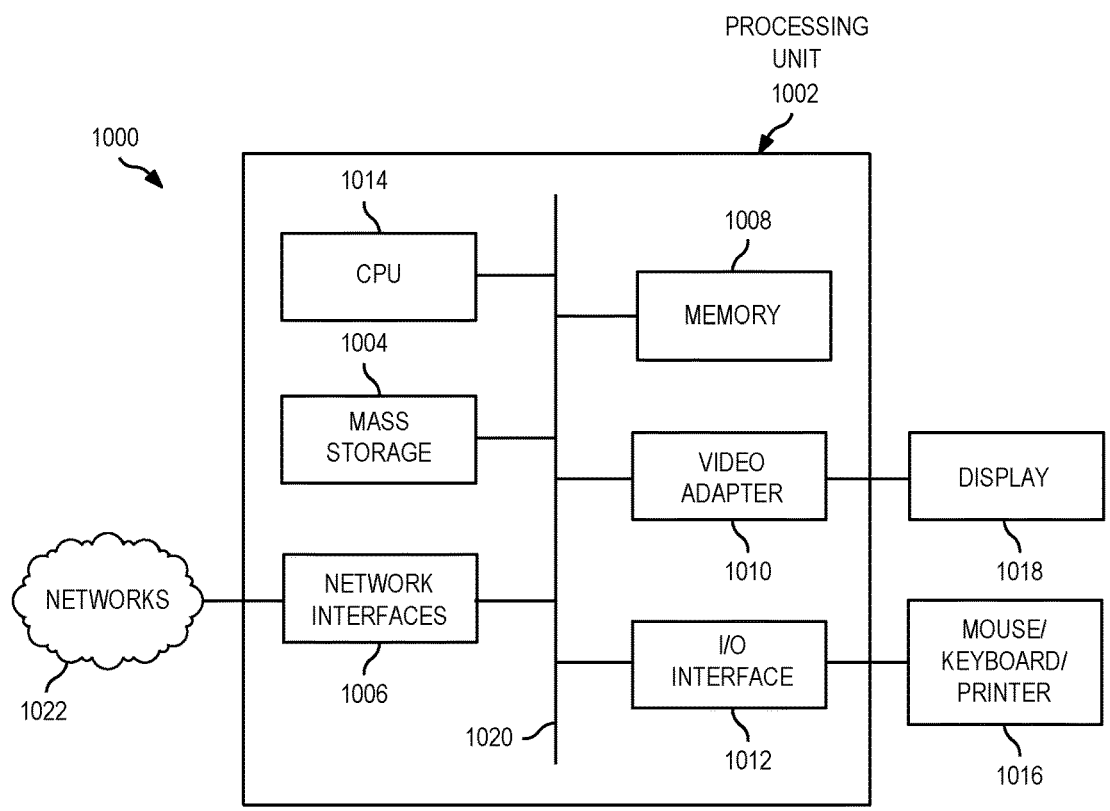
FIG. 10 is a block diagram of a computing system that may be used for implementing the devices and methods disclosed herein.

FIG. 10 is a block diagram of a computing system 1000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1000 includes a processing unit 1002. The processing unit includes a central processing unit (CPU) 1014, memory 1008, and may further include a mass storage device 1004, a video adapter 1010, and an I/O interface 1012 connected to a bus 1020.

The bus 1020 may be one or more of any type of several bus architectures including a memory bus or memory controller, a peripheral bus, or a video bus. The CPU 1014 may comprise any type of electronic data processor. The memory 1008 may comprise any type of non-transitory system memory such as static random access memory (SRAM), dynamic random access memory (DRAM), synchronous DRAM (SDRAM), read-only memory (ROM), or a combination thereof. In an embodiment, the memory 1008 may include ROM for use at boot-up, and DRAM for program and data storage for use while executing programs.

The mass storage 1004 may comprise any type of non-transitory storage device configured to store data, programs, and other information and to make the data, programs, and other information accessible via the bus 1020. The mass storage 1004 may comprise, for example, one or more of a solid state drive, hard disk drive, a magnetic disk drive, or an optical disk drive.

The video adapter 1010 and the I/O interface 1012 provide interfaces to couple external input and output devices to the processing unit 1002. As illustrated, examples of input and output devices include a display 1018 coupled to the video adapter 1010 and a mouse, keyboard, or printer 1016 coupled to the I/O interface 1012. Other devices may be coupled to the processing unit 1002, and additional or fewer interface cards may be utilized. For example, a serial interface such as Universal Serial Bus (USB) (not shown) may be used to provide an interface for an external device.

The processing unit 1002 also includes one or more network interfaces 1006, which may comprise wired links, such as an Ethernet cable, or wireless links to access nodes or different networks. The network interfaces 1006 allow the processing unit 1002 to communicate with remote units via the networks. For example, the network interfaces 1006 may provide wireless communication via one or more transmitters/transmit antennas and one or more receivers/receive antennas. In an embodiment, the processing unit 1002 is coupled to a local-area network 1022 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a deriving unit or module, a measuring unit or module, a generating unit or module, or a reporting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
   receiving, by a first device from a second device, a channel state information (CSI) reporting configuration associated with a set of measurement resources and a time-interval configuration, the set of measurement resources comprising at least interference measurement resources, and the time-interval configuration specifying a measurement duration and a reporting time configuration;
   deriving, by the first device, CSI reporting quantities in accordance with measurements of the set of measurement resources during at least a portion of the measurement duration, the CSI reporting quantities comprising statistical quantities associated with at least interference measurements on the interference measurement resources received during the measurement duration; and
   reporting, by the first device to a third device, the CSI reporting quantities including the statistical quantities associated with the at least interference measurements after the measurement duration in accordance with the reporting time configuration,
   the reporting time configuration indicating at least one of a reporting time, a reporting periodicity, the reporting periodicity and a time offset, a CSI request configuration, or a reporting event trigger configuration.

2. The method of claim 1, the deriving the CSI reporting quantities comprising:
   measuring, by the first device, the set of measurement resources during the at least the portion of the measurement duration;
   generating, by the first device, measurement samples in accordance with the measurements of the set of measurement resources; and
   deriving, by the first device, the CSI reporting quantities in accordance with the measurement samples.

3. The method of claim 1, the CSI reporting quantities comprising channel quality indicators (CQIs), interference to noise ratios (INRs), log-likelihood ratios (LLRs), signal to noise ratios (SNRs), modulation and coding scheme (MCS), block error rate (BLER), or signal plus interference to noise ratios (SINRs).

4. The method of claim 1, the statistical quantities comprising at least one of a mean, an average, a maximum, a minimum, a change (Δ), an X-percentile, or a higher order moment, of the CSI reporting quantities, where X is an integer value.

5. The method of claim 1, the set of measurement resources further comprising at least one of signal measurement resources or channel measurement resources.

6. The method of claim 1, the CSI reporting quantities further comprising statistical quantities of at least one of signal measurements or channel measurements.

7. The method of claim 1, further comprising:
   receiving, by the first device, a reporting enable.

8. The method of claim 7, the reporting enable comprising one of an activating message or an activating indicator.

9. A method comprising:
   sending, by a first device to a second device, a channel state information (CSI) reporting configuration associated with a set of measurement resources and a time-interval configuration, the set of measurement resources comprising at least interference measurement resources, and the time-interval configuration specifying a measurement duration and a reporting time configuration,
   the reporting time configuration indicating at least one of a reporting time, a reporting periodicity, the reporting periodicity and a time offset, a CSI request configuration, or a reporting event trigger configuration;
   transmitting, by the first device, signals in the set of measurement resources during at least a portion of the measurement duration; and
   after the measurement duration, receiving, by the first device from the second device, CSI reporting quantities of the signals comprising statistical quantities associated with at least interference measurements on the interference measurement resources received during the measurement duration.

10. The method of claim 9, the CSI reporting quantities comprising channel quality indicators (CQIs), interference to noise ratios (INRs), log-likelihood ratios (LLRs), signal to noise ratios (SNRs), modulation and coding scheme (MCS), block error rate (BLER), or signal plus interference to noise ratios (SINRs).

11. The method of claim 9, the statistical quantities comprising at least one of a mean, an average, a maximum, a minimum, a change (Δ), an X-percentile, or a higher order moment, of the CSI reporting quantities, where X is an integer value.

12. The method of claim 9, further comprising:
    transmitting, by the first device, to the second device, a reporting enable.

13. The method of claim 12, the reporting enable comprising one of an activating message or an activating indicator.

14. The method of claim 13, the activating message being transmitted in a media access control (MAC) control element (CE) (MAC CE), and the activating indicator being transmitted in a downlink control information (DCI).

15. A first device comprising:
    one or more processors; and
    a non-transitory memory storage comprising instructions that, when executed by the one or more processors, cause the first device to:
    receive, from a second device, a channel state information (CSI) reporting configuration associated with a set of measurement resources and a time-interval configuration, the set of measurement resources comprising at least interference measurement resources, and the time-interval configuration specifying a measurement duration and a reporting duration time configuration;

derive CSI reporting quantities in accordance with measurements of transmission on the set of measurement resources during at least a portion of the measurement duration, the CSI reporting quantities comprising statistical quantities associated with at least interference measurements on the interference measurement resources received during the measurement duration; and report, to a third device, the CSI reporting quantities including the statistical quantities associated with the at least interference measurements after the measurement duration in accordance with the reporting time configuration, the reporting time configuration indicating at least one of a reporting time, a reporting periodicity, the reporting periodicity and a time offset, a CSI request configuration, or a reporting event trigger configuration.

16. The first device of claim 15, the instructions further causing the first device to:

measure the set of measurement resources during the at least the portion of the measurement duration; generate measurement samples in accordance with the measurements of the set of measurement resources; and derive the CSI reporting quantities in accordance with the measurement samples.

17. The first device of claim 15, the CSI reporting quantities comprising channel quality indicators (CQIs), interference to noise ratios (INRs), log-likelihood ratios (LLRs), signal to noise ratios (SNRs), modulation and coding scheme (MCS), block error rate (BLER), or signal plus interference to noise ratios (SINRs).

18. The first device of claim 15, the statistical quantities comprising at least one of a mean, an average, a maximum, a minimum, a change ($\Delta$), an X-percentile, or a higher order moment, of the CSI reporting quantities, wherein X is an integer value.

19. The first device of claim 15, the set of measurement resources further comprising at least one of signal measurement resources or channel measurement resources.

20. The first device of claim 15, the CSI reporting quantities further comprising statistical quantities of at least one of signal measurements or channel measurements.

21. The first device of claim 15, the instructions further causing the first device to receive a reporting enable.

22. The first device of claim 21, the reporting enable comprising one of an activating message or an activating indicator.

23. A first device comprising:

one or more processors; and a non-transitory memory storage comprising instructions that, when executed by the one or more processors, cause the first device to:

send, to a second device, a channel state information (CSI) reporting configuration associated with a set of measurement resources and a time-interval configuration, the set of measurement resources comprising at least interference measurement resources, and the time-interval configuration specifying a measurement duration and a reporting duration time configuration, the reporting time configuration indicating at least one of a reporting time, a reporting periodicity, the reporting periodicity and a time offset, a CSI request configuration, or a reporting event trigger configuration;

transmit signals in the set of measurement resources during at least a portion of the measurement duration; and after the measurement duration, receive, from the second device, CSI reporting quantities comprising statistical quantities associated with at least interference measurements on the interference measurement resources received during the measurement duration.

24. The first device of claim 23, the CSI reporting quantities comprising channel quality indicators (CQIs), interference to noise ratios (INRs), log-likelihood ratios (LLRs), signal to noise ratios (SNRs), modulation and coding scheme (MCS), block error rate (BLER), or signal plus interference to noise ratios (SINRs).

25. The first device of claim 23, the statistical quantities comprising at least one of a mean, an average, a maximum, a minimum, a change ($\Delta$), an X-percentile, or a higher order moment, of the CSI reporting quantities, wherein X is an integer value.

26. The first device of claim 23, the instructions further causing the first device to:

transmit, to the second device, a reporting enable.

27. The first device of claim 26, the reporting enable comprising one of an activating message or an activating indicator.

28. The first device of claim 27, the activating message being transmitted in a media access control (MAC) control element (CE) (MAC CE), and the activating indicator being transmitted in a downlink control information (DCI).

* * * * *

UNITED STATES PATENT AND TRADEMARK OFFICE
CERTIFICATE OF CORRECTION

PATENT NO. : 12,342,200 B2
APPLICATION NO. : 17/731845
DATED : June 24, 2025
INVENTOR(S) : Xiao et al.

Page 1 of 1

It is certified that error appears in the above-identified patent and that said Letters Patent is hereby corrected as shown below:

In the Claims

In Column 26, in Claim 4, Line 1, delete "(A)," and insert -- ($\Delta$), --.

In Column 26, in Claim 11, Line 45, delete "(A)," and insert -- ($\Delta$), --.

In Column 27, in Claim 15, Lines 2-3, after "reporting" delete "duration".

In Column 28, in Claim 23, Line 13, after "reporting" delete "duration".

Signed and Sealed this
Twenty-second Day of July, 2025

Coke Morgan Stewart
*Acting Director of the United States Patent and Trademark Office*